United States Patent
Blackwell et al.

(10) Patent No.: US 9,367,740 B2
(45) Date of Patent: Jun. 14, 2016

(54) SYSTEM AND METHOD FOR BEHAVIORAL RECOGNITION AND INTERPRETRATION OF ATTRACTION

(71) Applicants: Crystal Morgan Blackwell, Atlanta, GA (US); Josele Antonio Salazar, Stockbridge, GA (US)

(72) Inventors: Crystal Morgan Blackwell, Atlanta, GA (US); Josele Antonio Salazar, Stockbridge, GA (US)

( * ) Notice: Subject to any disclaimer, the term of this patent is extended or adjusted under 35 U.S.C. 154(b) by 71 days.

(21) Appl. No.: 14/509,611

(22) Filed: Oct. 8, 2014

(65) Prior Publication Data

US 2015/0310278 A1 Oct. 29, 2015

Related U.S. Application Data

(60) Provisional application No. 61/985,521, filed on Apr. 29, 2014.

(51) Int. Cl.
*G06K 9/00* (2006.01)

(52) U.S. Cl.
CPC ........ *G06K 9/00604* (2013.01); *G06K 9/00778* (2013.01)

(58) Field of Classification Search
CPC .................. G06K 9/00604; G06K 9/00778
USPC .................................. 382/117, 118
See application file for complete search history.

(56) References Cited

U.S. PATENT DOCUMENTS

| | | | | |
|---|---|---|---|---|
| 6,152,563 A * | 11/2000 | Hutchinson | ............ | A61B 3/113 351/209 |
| 7,379,560 B2 * | 5/2008 | Bradski | ................ | G06F 1/3203 345/156 |
| 2010/0254609 A1 * | 10/2010 | Chen | ................. | G06K 9/00221 382/195 |
| 2010/0266213 A1 * | 10/2010 | Hill | .......................... | A61B 5/16 382/218 |
| 2010/0328492 A1 * | 12/2010 | Fedorovskaya | ........ | G06Q 30/02 348/231.2 |
| 2011/0296163 A1 * | 12/2011 | Abernethy | ............ | G06F 1/3203 713/100 |
| 2012/0243751 A1 * | 9/2012 | Zheng | ................. | G06K 9/00315 382/118 |
| 2013/0300900 A1 * | 11/2013 | Pfister | ................ | G06K 9/00315 348/239 |
| 2013/0308855 A1 * | 11/2013 | Li | ...................... | G06K 9/00221 382/159 |
| 2013/0337421 A1 * | 12/2013 | Gerken, III | .............. | G09B 5/00 434/236 |
| 2014/0050408 A1 * | 2/2014 | Balasubramanian | ..................... | G06K 9/00281 382/195 |
| 2014/0063236 A1 * | 3/2014 | Shreve | ............... | G06K 9/00228 348/143 |
| 2014/0316881 A1 * | 10/2014 | Movellan | ........... | G06K 9/00315 705/14.42 |
| 2014/0340639 A1 * | 11/2014 | Rust | ....................... | A61B 3/113 351/209 |
| 2014/0344012 A1 * | 11/2014 | Kamhi | ...................... | G06F 3/14 705/7.29 |
| 2014/0347265 A1 * | 11/2014 | Aimone | ................. | G09G 3/003 345/156 |
| 2015/0042777 A1 * | 2/2015 | Taguchi | ............. | G06K 9/00604 348/78 |
| 2015/0121246 A1 * | 4/2015 | Poore | ...................... | A63F 13/00 715/745 |

\* cited by examiner

*Primary Examiner* — John Strege
(74) *Attorney, Agent, or Firm* — Dunlap, Bennett & Ludwig PLLC

(57) ABSTRACT

A mobile system for identifying behavior of being physical attracted towards an individual includes a portable computing device carried by a user having at least one camera. For this system, interested individuals are those that exhibit behavioral indications of physical attraction, referred to here as a "check out". The software includes an individual detector technique, such as infrared, that detects the presence of individuals in the proximity of the device's camera. The software further includes a body position identifier that determines whether an individual detected by the individual detector is facing the portable device. The software further includes a behavior analyzer that analyzes the body and eye movements of an individual detected to determine if the individual has checked out at the user. The computer further includes a recorder that records and counts instances of individuals checking out the user.

13 Claims, 3 Drawing Sheets

SYSTEM AND METHOD FOR BEHAVIORAL RECOGNITION AND INTERPRETRATION OF ATTRACTION

BACKGROUND

Currently, individuals do not have a way to accurately gauge the level of attention that they receive in their surroundings, specifically attention relating to physical desire. It is difficult to objectively determine if individuals are attracted to oneself. Even more difficult is to analyze over-all level of attractiveness in an environment when multiple individuals are in the proximity. The human brain has a limitation on the ability to simultaneously process many stimuli and analyzing multiple individuals' behaviors at once is not viable. A companion (i.e. a wingman) can assist to an extent in deriving such information. However, this is also prone to all of the same issues mentioned above. In addition to determining if people are checking you out in a positive way, there is also a need to determine if strangers are giving you unwanted attention such as sexual harassment.

There remains a need in the art for a way to codify the recognition and interpretation of this attraction behavior received from a group composed of one to many individuals in a person's periphery with a high degree of accuracy and effectiveness on ubiquitous computing devices.

BRIEF SUMMARY

A system for identifying interested individuals then analyzing and interpreting their behaviors includes a portable computing device carried by a user having at least one camera. For this system, interested individuals are those that exhibit behavioral indications of physical attraction, referred to here as a "check out". The software includes an individual detector technique, such as infrared, that detects the presence of individuals in the proximity of the device's camera. The software further includes a body position identifier that determines whether an individual detected by the individual detector is facing the portable device. The software further includes a behavior analyzer that analyzes the body and eye movements of an individual detected to determine if the individual has checked out at the user. The software further includes a recorder that records and counts instances of individuals checking out the user.

In some embodiments, the behavior analyzer determines that the individual has checked out at the user if the individual looks in the direction of the portable device and was not previously looking in that direction. In some embodiments, the behavior analyzer determines that the individual has checked out at the user if the individual moves their eyes up and down while looking in the direction of the portable device. In some embodiments, the system further includes a database that stores footage recorded by the at least one camera prior to the analysis performed by the software and a player that plays footage of checkout instances in response to a request from the user. In some embodiments, the portable device is a smartphone and the at least one camera is a front and rear camera of the smartphone. In some embodiments, the software further includes a notification system that alerts the user of a "check out" instance. In some embodiments, the method further includes deleting the footage subsequent to determining an instance of a check out.

DETAILED DESCRIPTION

As stated above, currently, individuals do not have a way to accurately gauge the level of attention that they receive in their surroundings, specifically attention relating to physical desire. It is difficult to objectively determine if individuals are attracted to oneself. Even more difficult is to analyze over-all level of attractiveness in an environment when multiple individuals are in the proximity. The main flaws with this technique lie in human error due to bias, lack of focus, and inability to process multiple stimuli simultaneously to analyze many people's behavior concurrently. Furthermore, the current best alternative of having a wingman only reduces these problems. The system claimed here solves this problem through software automation of this behavioral recognition and analysis process.

The Version of The System Discussed Here Includes:
1. A software application installed on mobile device with video recording capabilities.
2. The software uses the device's camera to record the user's surroundings.
3. In the recorded video, the software splices the feed into image segments.
4. If in one of the scenes pulled from this video, a person is looking in the direction of the camera the software will continue to analyze the scenario because it is a potential checkout.
5. In the potential checkout scenario, the software will compare the scene snapshots immediately before and after to the one from step 4.
6. According to one embodiment, the method of registering a checkout is if the person in the image was not looking in the direction of the camera previously (i.e. they turned their head around to look).
7. According to another embodiment, the method of registering a checkout is if the person in the image was already looking in the direction of the camera and has moved their eyes up and down to examine the user.

Figure 1:
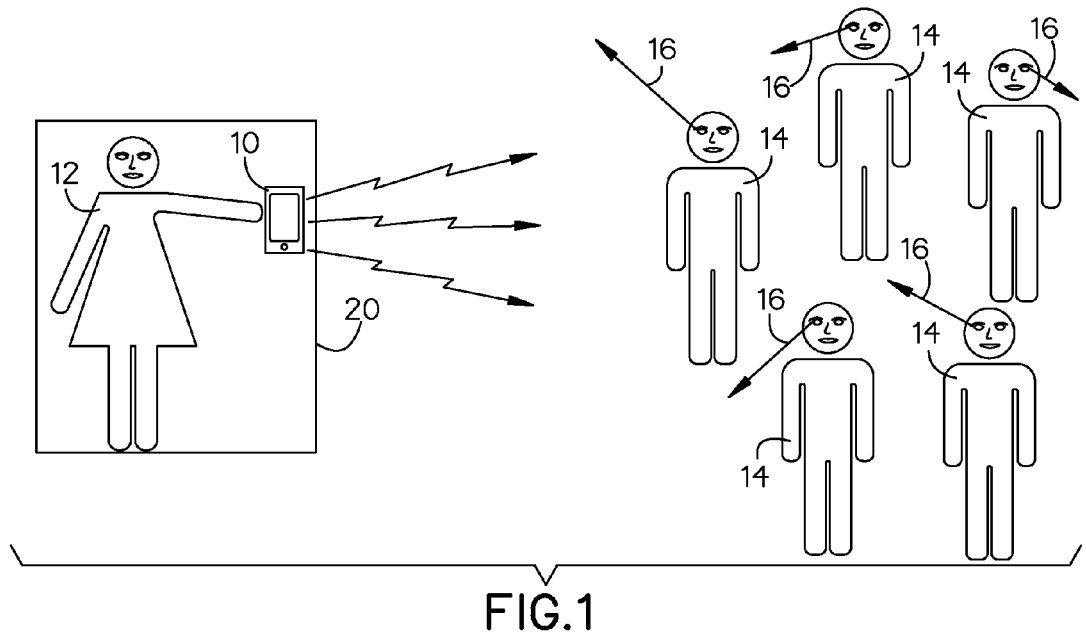
FIG. 1 is a schematic of one embodiment of the system in operation.

FIG. 1 shows the system in use. A user 12 could use this system in, i.e. a bar or club. Regardless of the user's location, lack of focus, or the absence of a companion, user 12 will be able to determine who has checked them out at the venue. In this embodiment, other patrons 14, of the venue are looking in various directions 16. User 12 has a smartphone 10 or other mobile device with a camera that has the software described herein running. The software can determine if any of the patrons 14 have looked within the target square 20—which is the direct vicinity of user 12.

Figure 2:
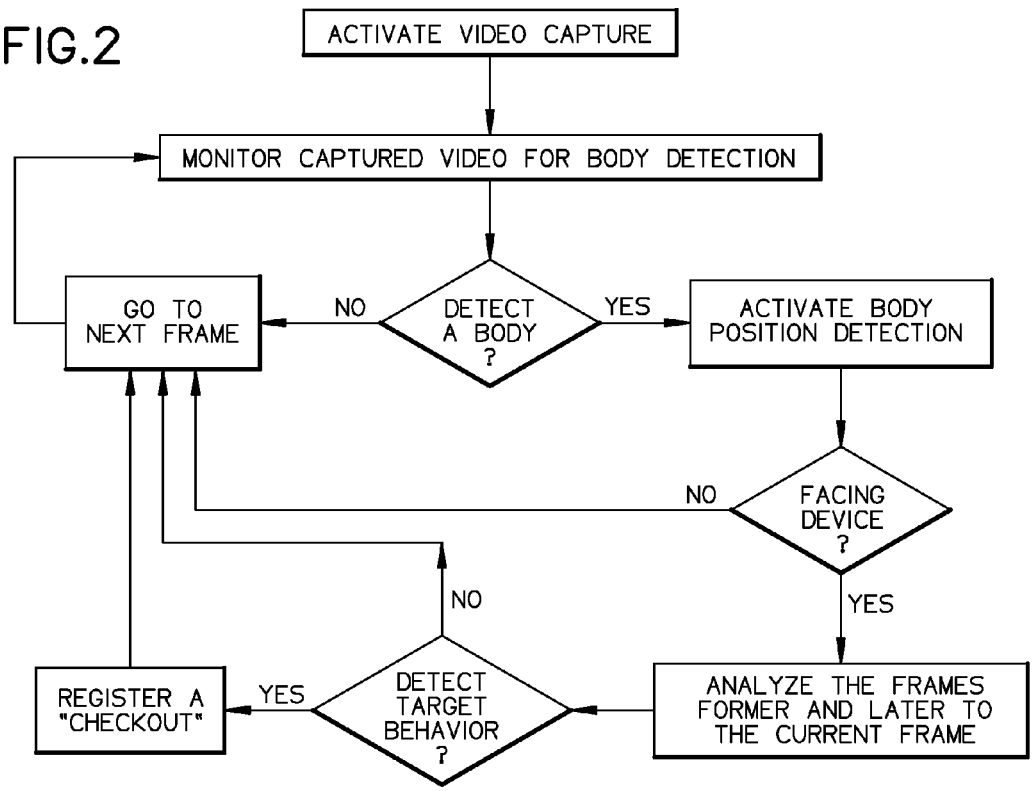
FIG. 2 is a flow chart of the method according to the embodiment shown in FIG. 1.

FIG. 2 is a flow-chart of the method according to one embodiment. After the user turns on the app, video recording will be collected via the device's camera. These recordings will then be analyzed and parsed into still-frame images according to the process below.

First, infrared detection or similar body detection technology will be used to determine if an outline of one or more other people exists. If one or more people are in the video feed, the app will analyze if any of those people are facing the direction of the device (see FIG. 2: Body Position Detection). The individual 14 being scanned is said to be looking in the direction of user 12 if their gaze falls within a window of three dimensional coordinates at a certain time (t). These coordinates fall into a cube surrounding the user's outline 20.

Figure 5:
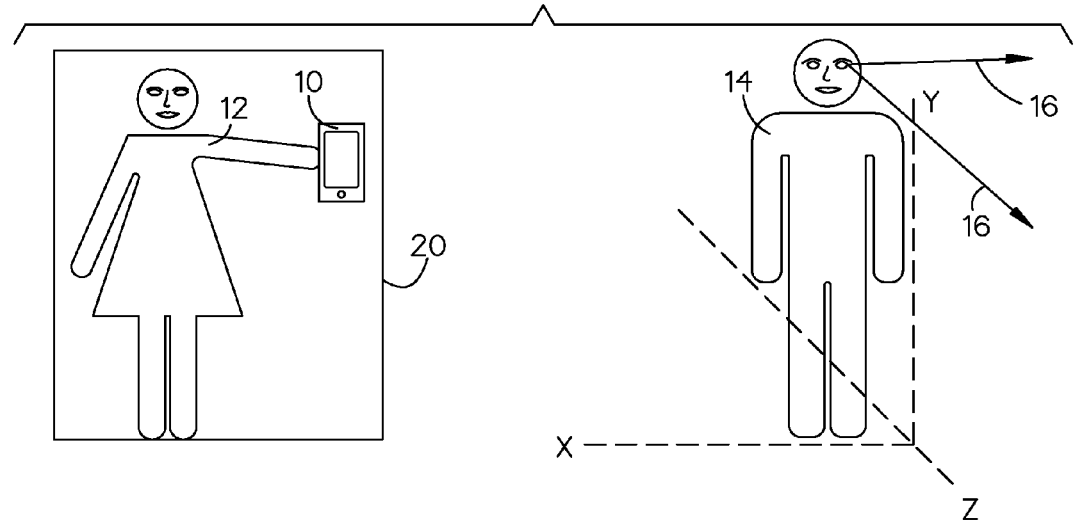
FIG. 5 is a schematic of an individual of FIG. 1 prior to gazing at the user.
Figure 6:
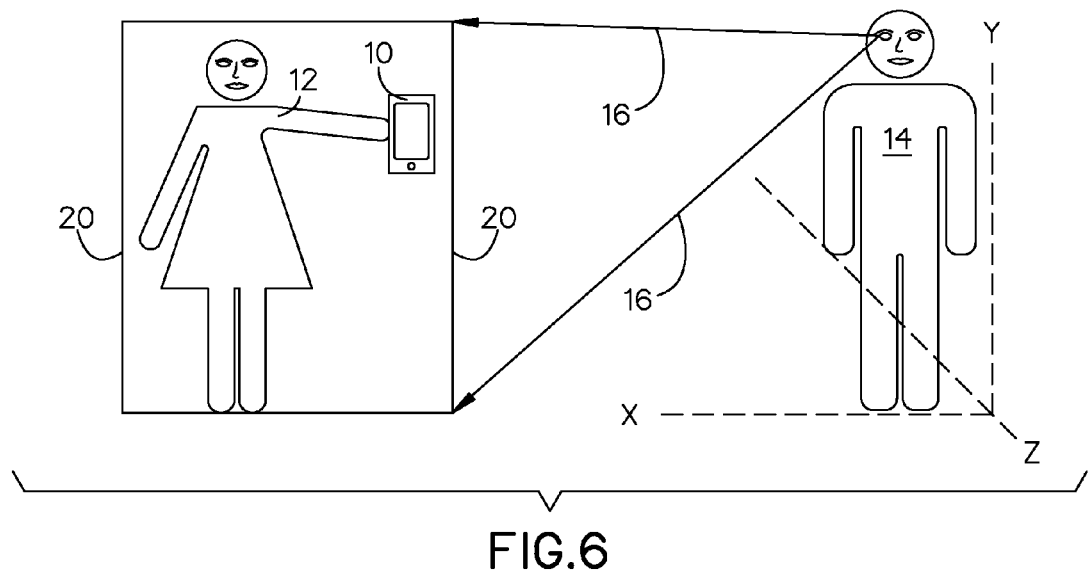
FIG. 6 is a schematic of the individual of FIG. 5 gazing at the user.
Figure 7:
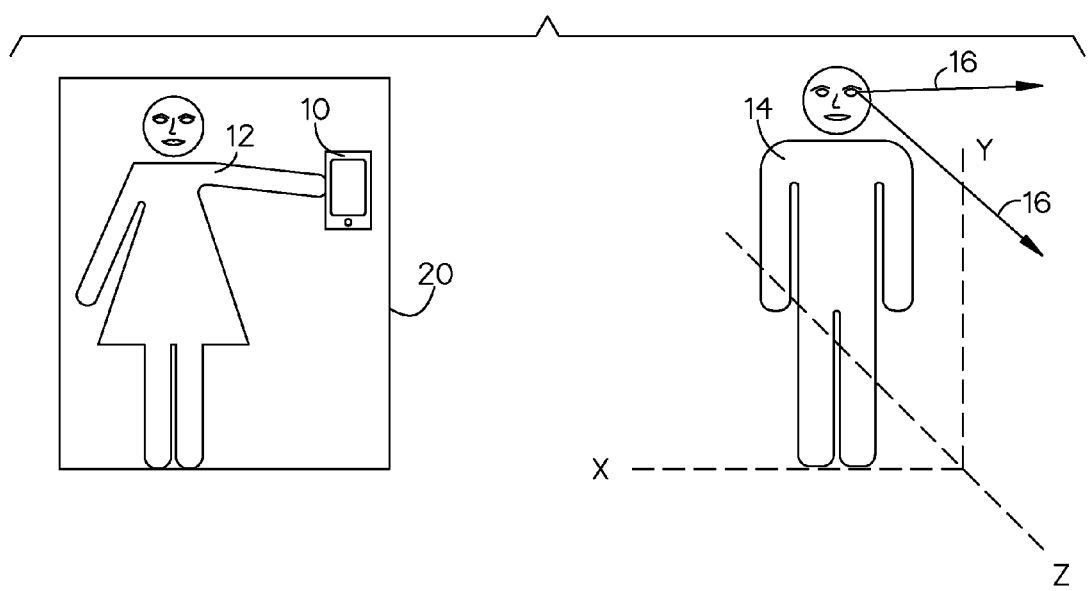
FIG. 7 is a schematic of the individual of FIGS. 5 and 6 after gazing at the user.

If a person 14 in the video at time t above is facing in the direction of the device, then the software will consider then person to be a person of interest. The images in time right before (t−1) and right after (t+1) this instant should be pulled until it can be determined whether or not it counts as a "check out". This is shown in FIGS. 5-7. Note that there is the requirement that the images at t−1 and t+1 are not the same position as t. If there is no change or movement between frames, then search further out in time to select an appropriate sample frame.

The behaviors of the target 14 detected for a check out in several embodiments are as follows:
1. the person 14 moved their eyes (or eye line 18) up and down while looking in the direction 16 of device 10 (see FIGS. 4A-C) or
2. the person 14 turned their face to look in the direction of device 10 (FIGS. 5-7).

If either of these occur, then this should be classified as a "check out" and increment the number of checkouts that the user 12 has received by one (see FIG. 2: Process Flow Diagram). There are separate processes for analyzing these two scenarios, interconnected by the previously described if-then logic.

Figure 4A:
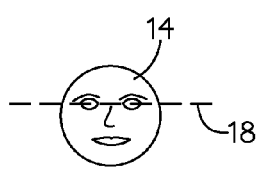
FIG. 4A is a schematic of the face of an individual in FIG. 1 whose eyes are in an equilibrium state.
Figure 4B:
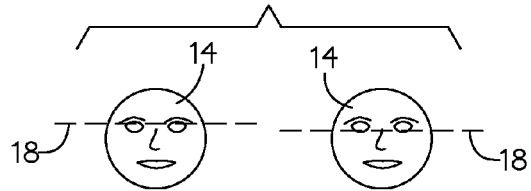
FIG. 4B is a schematic of the face of the individual in FIG. 4A whose eyes are moving up or down in the user's direction.
Figure 4C:
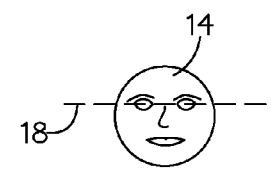
FIG. 4C is a schematic of the face of the individual in FIGS. 4A and 4B whose eyes have returned to an equilibrium state after moving in a user's direction.

To analyze the first scenario, where there is eye movement, the software will compare the three images for times t−1, t, and t+1 (FIGS. 5-7). Various existing techniques could be used for this, such as recognizing pupils of the eye may be used. For the purpose of our system, we propose to detect eye movement based on the change in where the majority of the eye whites fall (see FIGS. 4A-C). This technique will be more accurate at longer distances since the white color contrasts against the iris is higher than that of the pupil, especially for brown eyes. If the following changes are noted between the frames, then a checkout will be counted:
1. Frame 1 (time t−1; FIG. 4A): target 14's eyes are in a middle equilibrium state and eye whites equally distributed
2. Frame 2 (time t; FIG. 4B): target 14 moves their eyes up or down to look user 12 over
(this may depend on if user 12 is taller/shorter than target 14). (Look up (majority of eye whites on bottom) of Look down (majority of eye whites on top)).
3. Frame 3 (time t+1): target 14's eyes revert back to the initial middle equilibrium state.

Figure 3:
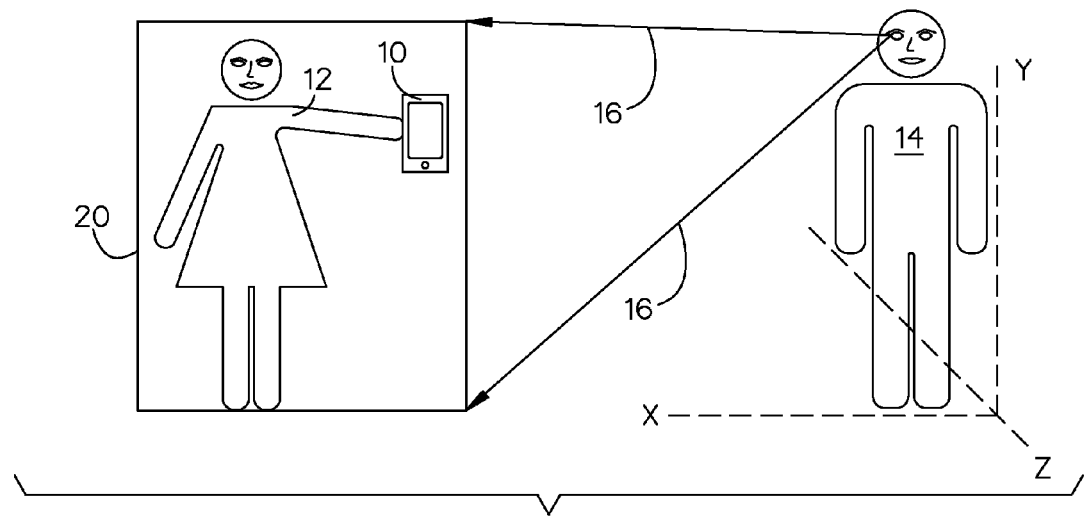
FIG. 3 is a schematic of an individual gazing at a user of the embodiment of the system shown in FIG. 1.

To analyze the second scenario, where a person's head turns to look, the software will compare the three images for times t−1, t, and t+1 (FIGS. 5-7). Various existing gaze recognition techniques could be used for this. For the purpose of our system, we propose to detect this not by analysis the gaze itself but the via direction of the person's body, face, and angle between these and the eyes. To do this, the system uses the same cube area 20 surrounding user 12 as in the FIG. 3 diagrams for body recognition. If target 14's body is not in the same direction of cube 20, but the face and eye angle 16 aligns with it, then the person has turned their head around to look at time t. If following changes are noted between frames, then a checkout will be counted:
1. Frame 1 (time t−1; FIG. 5): face and eye angle 16 not towards target square area 20
2. Frame 2 (time t; FIG. 6): face and eye angle 16 is towards the target square area 20
3. Frame 3 (time t+1; FIG. 7): face and eye angle 16 not towards target square area 20

The logical analysis according to one embodiment is:
IF the target 14 in an image is not looking in the direction of the device THEN we will not analyze this target 14 as a potential checkout.
IF the target 14 in the snapshot images is looking in the direction of the device 10 THEN
IF that target 14 looks user 12 up and down (eye movement between frames)
THEN it is a checkout
ELSE: it is not a checkout
OR
IF: the person was previously facing in a direction away from the device (i.e. turned to look)
THEN: it is a checkout
ELSE: it is not a checkout This software can be developed use a programming language compatible with mobile device operating systems. For example, Java development in the Android SDK for Kitkat. A mobile device 12 could include a tablet, laptop, phone, or any other ubiquitous computing device that has a camera. This software will utilize a tool or code library for object recognition and video/media manipulation to perform the analysis previously described. Note that the same programming language may not be used throughout all tools and libraries. Additionally, APIs can be used enable recording and storing video on the user's device 10, such as but not limited to the device's camera API. There must also be code to represent the user interface and handle passing data to and from the user interface.

The video recording data can be stored locally if processed fast enough to not exceed the memory of the local device. Alternatively, an enterprise architecture consisting of a web server, application server, and database back end can be used to store the data off the device until the software gets to process it. Regardless of the data storage option, in many embodiments the software hides the video recordings from the user and purges this video data immediately after processing completes. This will avoid disclosure of sensitive identity information of the people in the user's surrounding.

In some embodiments, the viewing range of the device's camera is not limited and a 360 degree view could be obtained. Furthermore, the system could also be improved to include an analysis on the symmetry of the person of interest in order by measure attractiveness level of the people that checkout the user. In many embodiments, the portable device is a smartphone having a camera on both the front and rear of the device, with recording and analysis of individuals in both views being used.

This software counts the number of check outs that user 12 receives to help them accurately gauge their level of physical attractiveness in their surroundings. The user 12 turns on the app so that the camera on the user's device can be activated. The user 12 must hold or store the device in such a way that the camera is not covered or obstructed during the period of software application use.

Although the invention has been described with reference to embodiments herein, those embodiments do not limit the invention. Modifications to those embodiments or other embodiments may fall within the scope of the invention.

What is claimed is:

1. A system for identifying behavior of being physical attracted towards an individual (the user), is comprised of:
    a portable device carried by a user, having:
        at least one camera; and
        the software system proposed here, having:
            an individual detector technique that detects the presence of individuals in the proximity of the device;
            a body position identifier that determines whether an individual detected by the individual detector is facing said portable device;
            a behavior analyzer that analyzes the eye movements of an individual determined to be facing said portable device by said body position identifier to determine if the individual has checked out the user; and
            a recorder that counts and records instances of individuals checking out the user.

2. The system of claim 1, wherein said behavior analyzer determines that the individual has checked out the user if the individual looks in the direction of said portable device and was not previously looking in that direction.

3. The system of claim 1, wherein said behavior analyzer determines that the individual has checked out the user if the individual moves their eyes up and down while looking in the direction of said portable device.

4. The system of claim 1, further comprising:
    a database that stores footage recorded by said at least one camera prior to the analysis performed by said software;
    wherein said software further comprises:
    a recorder that records footage from said at least one camera in said database; and
    an editor that removes footage that does not contain instances of a check out.

5. The system of claim 1, wherein said portable device is a smartphone and said at least one camera is a front and rear camera of the smartphone.

6. The system of claim 1, wherein said software further includes:
    a notification system that alerts the user of a check out instance.

7. A method of identifying check outs from other individuals, comprising:
    (a) video recording at least one individual using a portable device comprising a computer, at least one camera and a software executing on the computer;
    (b) storing footage obtained in step (a) in a database via the software executing on the computer;
    (c) determining which portions of the recording contain footage of an individual via the software executing on the computer;
    (d) determining whether the individual faces the portable device during the footage via the software executing on the computer;
    (e) analyzing the eye movements of the individual to determine if the individual has checked out a user; and
    (f) counting instances of individuals checking out the user.

8. The method of claim 7, wherein step (e) comprises determining that the individual has checked out the user if the individual looks in the direction of the portable device and was not previously looking in that direction.

9. The method of claim 7, wherein step (e) comprises determining that the individual has checked out the user if the individual moves their eyes up and down while looking in the direction of the portable device.

10. The method of claim 7, further comprising:
    (g) deleting footage that does not contain instances of a check out.

11. The method of claim 7, wherein the portable device is a smartphone, the software is executing on the smartphone, and the at least one camera is a front and rear camera of the smartphone.

12. The method of claim 7, further comprising:
    (g) notifying the user of a check out instance via the software executing on the computer.

13. The method of claim 7, further comprising:
    (g) deleting the footage subsequent to step (e).

* * * * *